Patented Dec. 5, 1950

2,533,171

UNITED STATES PATENT OFFICE 2,533,171

PROCESS FOR PREPARATION OF BENZOTHIOPHENE ANTHRAQUINONES

Fritz Max, Staten Island, N. Y., and Wilhelm Schmidt-Nickels, Little York, N. J., assignors to General Aniline & Film Corporation, New York, N. Y., a corporation of Delaware No Drawing. Application October 6, 1948, Serial No. 53,148

4 Claims. (Cl. 260—330)

This invention relates to an improved process for the preparation of benzothiophene anthraquinones.

It was known heretofore, as disclosed by Gilman et al. in Journal of Organic Chemistry, vol. 3, at page 119, to prepare benzothiophene anthraquinone (also called phthaloyl dibenzothiophene) by condensation of diphenylene sulfide (i. e., dibenzothiophene) with phthalic acid anhydride by heating in the presence of aluminum chloride in an inert solvent to form ortho-2-dibenzothenoyl benzoic acid

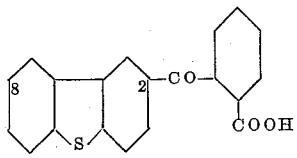

and effecting ring closure of the latter compound of fusion with sodium chloride and aluminum chloride. In this process, however, poor yields are obtained, and recovery of a pure product from the reaction mixture is rendered relatively difficult by the presence of relatively large amounts of decomposition products or unchanged starting materials. When it is attempted to effect the aforesaid ring closure by heating ortho-2-dibenzothenoyl benzoic acid with concentrated sulfuric acid (which is commonly employed in the preparation of anthraquinone compounds from orthocarboxy diaryl ketones), extensive sulfonation occurs, preventing recovery of substantial yields of the desired benzothiophene anthraquinone.

It has been found in accordance with this invention that benzothiophene anthraquinones can be obtained from the corresponding ortho-2-dibenzothenoyl benzoic acids by heating these compounds at condensation temperatures of at least 100° C. with a mixture of ortho-phosphoric acid and phosphorus pentoxide containing one-third to three mols of phosphorus pentoxide per mol of ortho-phosphoric acid, and preferably equimolecular amounts of these compounds. The condensation temperature can range from 100–210° C., but is preferably between 160 and 180° C., e. g., about 170° C. At the preferred temperature the reaction is quite rapid, requiring about 10 minutes for completion. It has been found that substantially quantitative yields of dibenzothiophene anthraquinones are obtained, based on the quantity of the ortho-2-dibenzothenoyl benzoic acid employed as the starting material.

Unsubstituted benzothiophene anthraquinone is obtained from ortho-2-dibenzothenoyl benzoic acid by the process of the invention. Mono-substituted derivatives containing, for example, chlorine, bromine or a nitro group in the benzene ring of the benzothiophene nucleus can be similarly obtained from correspondingly substituted ortho-2-dibenzothenoyl benzoic acids. Such substituents normally occupy the position of the aforesaid benzene ring para to the sulfur bridge.

The process of the invention is illustrated by the following examples, wherein parts and percentages are by weight and temperatures are in degrees centigrade.

Example 1

1 part of ortho-2-dibenzothenoyl benzoic acid, obtained as disclosed by Gilman et al. (loc. cit.) by condensation of approximately equimolecular amounts of phthalic anhydride and dibenzothiophene by heating these reagents together in the presence of aluminum chloride and an inert solvent such as nitrobenzene or tetrachlorethane or mixtures of these, was added to 10 parts of an equimolecular mixture of phosphorus pentoxide and ortho-phosphoric acid at a temperature of 170°. The reaction mixture was agitated while maintaining the temperature at 170° for 10 minutes, and then poured into 100 parts of water. The resulting slurry was filtered and the filter cake washed with water until neutral. In order to remove small amounts of impurities and unreacted intermediates, the filter cake was refluxed for 20 hours with 23 parts of a dilute aqueous solution of sodium hypochlorite (8%) and sodium hydroxide (1%). The insoluble product was recovered by filtration, washing with water until neutral and drying the filter cake. A light yellow product was obtained of satisfactory purity for use in the preparation of dyestuffs and their intermediates. The yield was approximately quantitative, based on the amount of ortho-2-dibenzothenoyl benzoic acid employed as the starting material. An analysis of a vacuum sublimed sample of the product yielded the following results:

|  | C | H | S |
|---|---|---|---|
| Found | 76.36% | 3.28% | 10.23% |
| Theory for $C_{20}H_{10}O_2S$ | 76.43% | 3.18% | 10.19% |

Example 2

116 parts of 8-chloro-2-ortho-dibenzothenoyl benzoic acid .

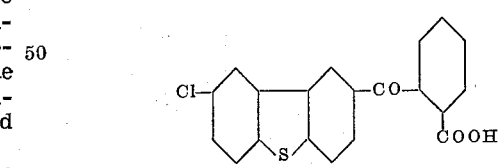

prepared by condensation according to the method of Gilman et al. from 2-chloro-dibenzothiophene and phthalic anhydride in the presence of aluminum chloride, are subjected to ring closure by heating at 170° C. with 1000 parts of an equimolecular mixture of ortho-phosphoric acid and phosphorus pentoxide for 10 minutes. The resulting benzothiophene anthraquinone is separated from the reaction mixture and purified by the same method as that of Example 1. Chlorobenzothiophene anthraquinone is obtained in substantially quantitative yields, the chlorine occupying a position in the benzene ring of the benzothiophene nucleus para to the sulfur atom.

Instead of the 8-chloro derivative of ortho-2-dibenzothenoyl benzoic acid, the corresponding 8-bromo or 8-nitro derivative can be used, whereby corresponding bromo and nitro derivatives of benzothiophene anthraquinone are respectively obtained instead of the chloro derivative of Example 2. The mono-nitro benzothiophene anthraquinone thus obtained can be converted to the corresponding amino compound by reduction with aqueous alkali metal sulfide or with zinc and acetic acid.

The benzothiophene anthraquinones of this invention can be converted by vatting (e. g., with alkaline hydrosulfite) to the corresponding leuco compounds, which show substantivity towards cellulosic fibers. Thus, the product of Example 1 yields an alkaline hydrosulfite vat which dyes cotton in light yellow shades upon subsequent aging treatment involving oxidation on the fiber.

The products obtained according to the invention can also be converted to the corresponding leuco sulfuric acid ester salts, as illustrated in the following example.

*Example 3*

35 parts of chlorsulfonic acid were added to 197 parts of pyridine. 15.7 parts of the benzothiophene anthraquinone of Example 1, 8.4 parts of iron (by hydrogen), and 0.2 part of cuprous chloride were added to the pyridine mixture. After agitating for 4 hours at 48-50° in an atmosphere of carbon dioxide, the reaction mixture was poured into an aqueous solution containing sufficient sodium carbonate to neutralize the acid in the mixture. The pyridine was removed by vacuum distillation and the residual solution was filtered. Upon salting out the filtrate with potassium chloride, the potassium salt of the leuco sulfuric acid ester of the benzothiophene anthraquinone of Example 1 was precipitated, and recovered by filtration. When the product thus obtained is employed for dyeing or printing cotton and developed in an acid oxidizing bath, light yellow shades are produced similar to those obtained by the vat dyeing procedure described above, employing the product of Example 1 in an alkaline hydrosulfite bath.

As indicated in the foregoing, the proportions of phosphorus pentoxide in the ring closing reaction mixture can be varied from one-third to three mols per mol of ortho-phosphoric acid, while equimolecular amounts are preferred. Higher concentrations of phosphorus pentoxide within the aforesaid range accelerate the reaction; lower concentrations reduce the rate of the reaction. The proportions of the ring closing medium to the ortho-2-dibenzothenoyl benzoic acid employed should be such that phosphorus pentoxide is present in excess of the amount required to combine with all of the water formed by ring closure. Preferably, a relatively large excess is used, as illustrated in the foregoing examples. The condensation temperature as stated above is within the range of 100°-200° C., the reaction rate being increased with an increase in temperature. Temperatures of about 170° C., i. e., from 160-180° C., are preferred. While the reaction requires about 10 minutes under the preferred reaction conditions illustrated in the examples, the duration of the reaction may vary from one minute to several hours within the ranges specified above. While inert diluents can be added to the ring closing reaction mixture, they are unnecessary and their use is generally avoided since they tend to reduce the rate of reaction and must be subsequently recovered in the interest of economy.

The intermediate ortho-dibenzothenoyl benzoic acids employed in the process of the invention can be produced in general by condensation of phthalic anhydride with diphenylene sulfide (dibenzothiophene) or with its mono-substituted derivatives containing, for example, halogen or a nitro group in 8-position, by reaction in the presence of aluminum chloride and an inert diluent such as nitrobenzene or tetrachlorethane, whereby condensation of the phthalic anhydride occurs in 2-position of the dibenzothiophene nucleus. Ring closure in accordance with the invention is believed to yield a mixture of compounds having respectively the following formulae:

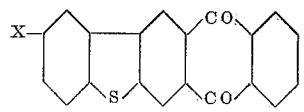

and

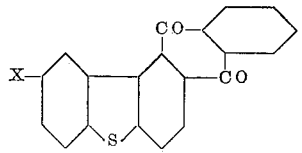

wherein X is hydrogen or a nuclear substituent such as chlorine, bromine or a nitro group.

The products obtained are valuable as dyestuff intermediates and in some cases as vat dyestuffs. As produced in accordance with the examples indicated above, the products obtained are of sufficient purity for use in further reactions, particularly dyestuff preparation. They can also be purified by recrystallization from organic solvents.

As compared with previously known processes, the procedure of this invention provides much higher yields of products having improved purity, in a more rapid and economical manner.

Variations and modifications which will be obvious to those skilled in the art are included within the scope of this invention.

We claim:

1. In a process for preparing a benzothiophene anthraquinone by ring closure of an ortho-2-dibenzothenoyl benzoic acid, the improvement which comprises heating said acid with a mixture of phosphorus pentoxide and ortho-phosphoric acid containing from one-third to three mols of phosphorus pentoxide per mol of phosphoric acid.

2. In a process for preparing benzothiophene anthraquinones by ring closure of an ortho-2-dibenzothenoyl benzoic acid, the improvement which comprises heating said acid with a mixture of phosphorus pentoxide and ortho-phosphoric acid containing from one-third to three mols of phosphorus pentoxide per mol of phosphoric acid at a temperature of from 100-210° C., the amount of phosphorus pentoxide being in excess of the amount theoretically required for combination with the liberated water.

3. In a process for preparing benzothiophene anthraquinones by ring closure of an ortho-2-dibenzothenoyl benzoic acid, the improvement which comprises heating said acid with an equimolecular mixture of phosphorus pentoxide and ortho-phosphoric acid at a temperature of from 160–180° C., phosphorus pentoxide being present in molecular excess of the amount required to combine with the liberated water.

4. In a process for preparing benzothiophene anthraquinone by ring closure of ortho-2-dibenzothenoyl benzoic acid, the improvement which comprises heating said acid with about 10 times its weight of an equimolecular mixture of ortho-phosphoric acid and phosphorus pentoxide at a temperature of from 160–180° C., for 10 minutes.

FRITZ MAX.
WILHELM SCHMIDT-NICKELS.

REFERENCES CITED

The following references are of record in the file of this patent:

UNITED STATES PATENTS

| Number | Name | Date |
|---|---|---|
| 2,174,118 | Calcott | Sept. 26, 1939 |

FOREIGN PATENTS

| Number | Country | Date |
|---|---|---|
| 499,745 | Germany | June 16, 1930 |

OTHER REFERENCES

Gilman: J. Org. Chem. 3, 119 (1938).

Certificate of Correction

Patent No. 2,533,171                          December 5, 1950

FRITZ MAX ET AL.

It is hereby certified that error appears in the printed specification of the above numbered patent requiring correction as follows:

Column 1, line 20, for the words "of fusion" read *by fusion*; line 30, for "proparation" read *preparation*; column 3, line 73, for "100°–200° C." read *100°–210° C.*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*